US010120347B2

(12) United States Patent
Martinez Pinillos

(10) Patent No.: US 10,120,347 B2
(45) Date of Patent: Nov. 6, 2018

(54) POWER GENERATOR PROTECTION UNIT

(71) Applicant: Grupo Guascor, S.L. Unipersonal, Miñano, Alava (ES)

(72) Inventor: Jaime Martinez Pinillos, Etxebarri (ES)

(73) Assignee: GRUPO GUASCOR, S.L. UNIPERSONAL, Alava (ES)

( * ) Notice: Subject to any disclaimer, the term of this patent is extended or adjusted under 35 U.S.C. 154(b) by 3 days.

(21) Appl. No.: 15/409,588

(22) Filed: Jan. 19, 2017

(65) Prior Publication Data

US 2017/0131686 A1 May 11, 2017

Related U.S. Application Data

(62) Division of application No. 13/899,739, filed on May 22, 2013, now Pat. No. 9,588,500.

(30) Foreign Application Priority Data

Jun. 7, 2012 (EP) ..................................... 12382234

(51) Int. Cl.
*H02J 3/40* (2006.01)
*G05B 9/02* (2006.01)
(Continued)

(52) U.S. Cl.
CPC ................. *G05B 9/02* (2013.01); *H02H 7/06* (2013.01); *H02J 3/00* (2013.01); *H02J 3/40* (2013.01);
(Continued)

(58) Field of Classification Search
CPC .. H02J 3/06; H02J 13/0062; H02J 3/40; H02J 3/42; H02J 3/08; G05B 2219/25213; G05B 2219/25232; H04L 12/1836
See application file for complete search history.

(56) References Cited

U.S. PATENT DOCUMENTS 4,788,647 A * 11/1988 McManus ............... F01K 13/02
340/3.7
5,181,026 A * 1/1993 Granville ............. G01R 15/183
324/96
(Continued)

Primary Examiner — Darrin D Dunn

(57) ABSTRACT

A generator protection unit is provided including a central processing unit including at least one programmable device configured to utilize an Ethernet communication protocol. The central processing unit may be configured to synchronize a first signal generated by a generator electrically coupled to the generator protection unit to a second signal including an electrical power grid parameter of an electrical power grid, the first signal and the second signal having a phase offset. The generator protection unit may also include a plurality of multimeters, each electrically coupled to the electrical power grid and the central processing unit, and at least one display filter electrically coupled to the central processing unit and configured to separate a defined portion of a protection parameter signal, such that a remaining portion of the protection parameter signal is transmitted to the central processing unit. The generator protection unit may further include a user interface coupled to the central processing unit and configured to relay at least the remaining portion of the protection parameter signal to an operator of the generator protection unit.

5 Claims, 1 Drawing Sheet

(51) Int. Cl.
*H02H 7/06* (2006.01)
*H02J 13/00* (2006.01)
*H02J 3/00* (2006.01)

(52) U.S. Cl.
CPC ......... *H02J 13/0062* (2013.01); *Y02E 60/725* (2013.01); *Y02E 60/7838* (2013.01); *Y04S 10/20* (2013.01); *Y04S 40/124* (2013.01)

(56) References Cited

U.S. PATENT DOCUMENTS

| | | | |
|---|---|---|---|
| 6,661,207 B2 | 12/2003 | Nelson et al. | |
| 8,095,243 B2 * | 1/2012 | Bhakta | H02J 13/0024 700/286 |
| 2009/0055031 A1 | 2/2009 | Slota et al. | |
| 2012/0063039 A1 | 3/2012 | Shah et al. | |
| 2012/0187770 A1 * | 7/2012 | Slota | H02J 3/42 307/87 |
| 2013/0066443 A1 * | 3/2013 | Kerr, III | G05B 19/0423 700/19 |
| 2013/0073100 A1 * | 3/2013 | Seeley | G01R 19/2513 700/290 |

* cited by examiner

POWER GENERATOR PROTECTION UNIT

CROSS-REFERENCE TO RELATED APPLICATIONS

The present application is a divisional of co-pending U.S. patent application Ser. No. 13/899,739, filed on May 22, 2013, which claims priority to European Patent Application Serial No. 12382234.8, filed on Jun. 7, 2012. These priority applications are hereby incorporated by reference in their entirety into the present application, to the extent that they are not inconsistent with the present application.

BACKGROUND

Generators may be used to supply an uninterrupted supply of power to an AC electrical power grid for many applications. In order to connect a generator to an electrical power grid to supply AC power, the generator must be synchronized to the electrical power grid in order to avoid damage to the generator or other connected rotating machinery. Generally, the generator is synchronized and may be attached to the electrical power grid when the output voltage or current of the generator is at nearly the precise point on its sinusoidal waveform as that of the voltage or current of the electrical power grid. When the two waveforms are substantially synchronous, or in phase, with each other, a circuit breaker connecting the generator to the electrical power grid may be closed. If the circuit breaker is closed before the generator and electrical power grid are in voltage phase alignment, severe damage to the generator, other connected rotating machinery, such as a prime mover, or the circuit breaker may occur.

Typically, a synchronizing relay may be used during a generator start-up to determine when it is permissible to close the circuit breaker relay thereby connecting the generator to the electrical power grid. These devices are generally designed only to synchronize an isolated generator to an electrical power grid by comparing the waveforms on either side of the circuit breaker. As such, these synchronizing relays may not be able to detect system faults including over-current, over-voltage, reverse power flow, over-frequency, and under-frequency conditions that may occur before the closing of the circuit breaker, creating an asynchronous condition resulting in the aforementioned damage to the generator.

To counter system faults, many protections schemes have been introduced to detect and isolate system faults utilizing protective relays. Typically, generators may be equipped with a host of protective relays to isolate the generator from the electrical power grid in certain system conditions. For example, a generator may include under/over voltage and under/over frequency relays capable of detecting potential asynchronous conditions occurring while the generator is temporarily isolated or islanded.

Further, the measurement and monitoring of the generator and electrical power grid characteristics such as voltage, current, frequency, and the like, as mentioned above, may be important to the proper synchronization of the generator to the electrical power grid. Typically, a multimeter may be used to determine, for example, voltage or current of the generator and/or the electrical power grid. However, the requirement of separate equipment to provide each of the measuring and monitoring of the generator and electrical power grid, the synchronization of the generator to the electrical power grid, and the protective relays to ensure system faults are detected and isolated to prevent damage to the generator may typically result in increased capital and operating costs, including installation and maintenance costs, and increased space requirements.

What is needed, then, is a compact and efficient device capable of providing for the monitoring and metering of the generator and electrical power grid, synchronization of the generator to the electrical power grid, and protection of the generator.

SUMMARY

Embodiments of the disclosure may provide a generator protection unit. The generator protection unit may include a central processing unit including at least one programmable device configured to utilize an Ethernet communication protocol. The central processing unit may be configured to synchronize a first signal generated by a generator electrically coupled to the generator protection unit to a second signal including an electrical power grid parameter of an electrical power grid, the first signal and the second signal having a phase offset. The generator protection unit may also include a plurality of multimeters, each electrically coupled to the electrical power grid and the central processing unit, and at least one display filter electrically coupled to the central processing unit and configured to separate a defined portion of a protection parameter signal, such that a remaining portion of the protection parameter signal is transmitted to the central processing unit. The generator protection unit may further include a user interface coupled to the central processing unit and configured to relay at least the remaining portion of the protection parameter signal to an operator of the generator protection unit.

Embodiments of the disclosure may further provide a generator protection system electrically coupled to an electrical power grid. The generator protection system may include a generator protection unit including a central processing unit including at least one programmable device configured to utilize an Ethernet communication protocol. The central processing unit may be configured to synchronize a first signal generated by a generator electrically coupled to the generator protection unit to a second signal including an electrical power grid parameter of the electrical power grid, the first signal and the second signal having a phase offset. The generator protection unit may also include a plurality of multimeters electrically coupled to the electrical power grid and the central processing unit, and at least one display filter electrically coupled to the central processing unit and configured to separate a defined portion of a protection parameter signal, such that a remaining portion of the protection parameter signal is transmitted to the central processing unit. The generator protection unit may further include a user interface electrically coupled to the central processing unit and configured to relay at least the remaining portion of the protection parameter signal to an operator of the generator protection unit. The generator protection system may also include a circuit breaker operatively coupled to the generator protection unit, such that the circuit breaker is configured to provide for the transmission of electrical power therethrough depending on an output signal received from the generator protection unit. The generator protection system may further include one or more instrument transformers operatively coupled to the generator protection unit. The one or more instrument transformers may be configured to detect a fault and to transmit a fault signal to the generator protection unit upon detection of the fault.

Embodiments of the disclosure may further provide a method for protecting a generator electrically coupled to an electrical power grid. The method may include detecting a fault proximal to a generator and a generator protection system. The generator protection system may include a generator protection unit including a central processing unit including at least one programmable device configured to utilize an Ethernet communication protocol. The central processing unit may be configured to synchronize a first signal generated by a generator electrically coupled to the generator protection unit to a second signal including an electrical power grid parameter of the electrical power grid, the first signal and the second signal having a phase offset. The generator protection unit may also include a plurality of multimeters electrically coupled to the electrical power grid and the central processing unit, and at least one display filter electrically coupled to the central processing unit and configured to separate a defined portion of a protection parameter signal, such that a remaining portion of the protection parameter signal is transmitted to the central processing unit. The generator protection unit may further include a user interface electrically coupled to the central processing unit and configured to relay at least the remaining portion of the protection parameter signal to an operator of the generator protection unit. The generator protection system may also include a circuit breaker operatively coupled to the generator protection unit, such that the circuit breaker is configured to provide for the transmission of electrical power therethrough depending on an output signal received from the generator protection unit. The generator protection system may further include one or more instrument transformers operatively coupled to the generator protection unit. The one or more instrument transformers may be configured to detect a fault and to transmit a fault signal to the generator protection unit upon detection of the fault. The method may also include transmitting a fault signal to the central processing unit of the generator protection unit, and transmitting an output signal from the central processing unit of the generator protection unit to the circuit breaker, such that a flow of electrical power therethrough the circuit breaker and into the generator is disrupted such that the generator is protected.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
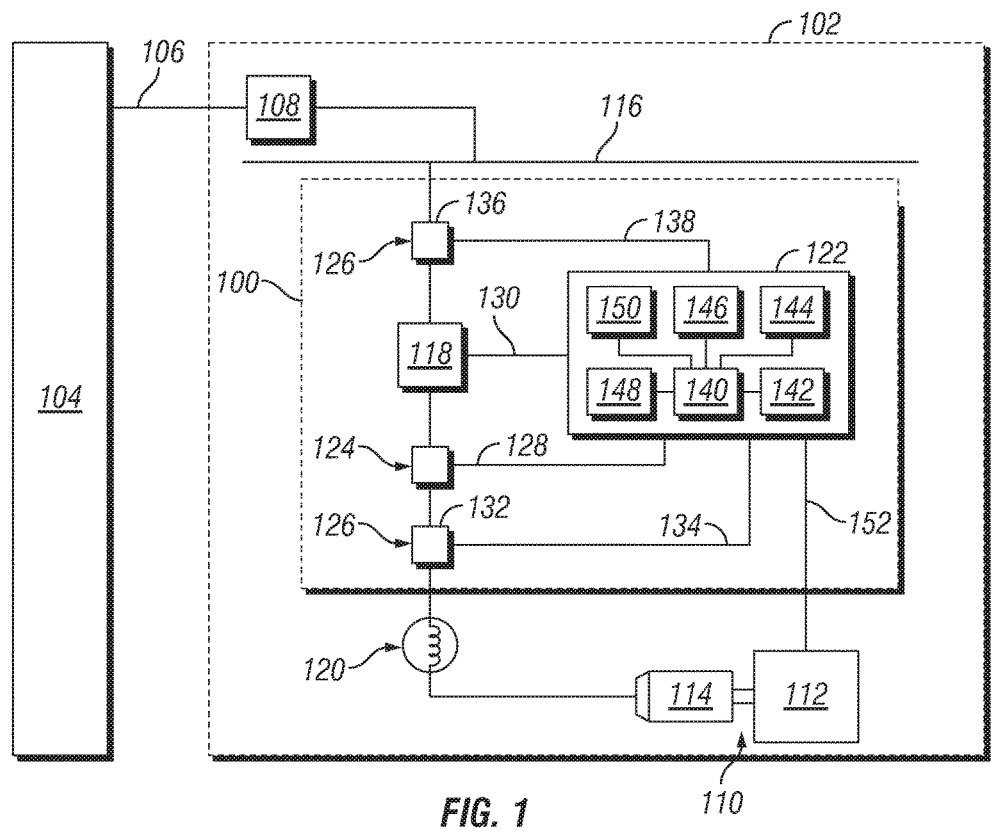
FIG. 1 illustrates a schematic view of an exemplary generator protection system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an exemplary generator protection system 100, according to an embodiment. The generator protector system 100 is operatively coupled to and included in a power generation source 102. The power generation source 102 is, in turn, electrically coupled to and configured to supply electrical power to an electrical power grid 104 via a power transmission network 106. The electric power grid 104 may include a plurality of generators, substations (buses), and transmission lines interconnecting the generator and substations to deliver the electric power to loads. For example, the electric power grid 104 may be an electric power grid located in Europe, or in the United States, such as the Eastern Interconnect, the Western Interconnect, or the Texas Interconnect. Such an electric power grid 104 may include thousands of generators, substations, and transmission lines interconnecting the generators and substations. One skilled in the art will recognize that this diagram is in the form of a single line diagram which represents a three-phase power system.

In an exemplary embodiment, the power transmission network 106 is coupled to the power generation source 102 via a distribution breaker 108. The distribution breaker 108 may be a conventional circuit breaker configured to control the connection of the power generation source 102 to the power transmission network 106. The distribution breaker 108 may include a switch (not shown) configured to "trip" or disrupt the flow of electrical power between the power transmission network 106 and the power generation source 102 when a fault or overload is detected in the electrical power grid 104. One of ordinary skill in the art will appreciate that the distribution breaker 108 may be any circuit breaker known in the art capable of regulating the transmission of electrical power between the power transmission network 106 and the power generation source 102.

The power generation source 102 may include one or more generator sets 110. In an embodiment, the power generation source 102 may include a plurality of generator sets 110 operatively connected in parallel. The number of generator sets 110 may vary and may depend, for example, on the magnitude of the electrical power required by the electric power grid 104, the space restrictions of the facility in which the generator sets 110 are disposed, financial considerations, electric bus capacity, breaker short circuit capacity.

The generator set 110 may include a driver 112 operatively coupled to a generator 116. In an exemplary embodiment, each generator set 110 includes a driver 112 operatively coupled to the generator 114. The driver 112 may be any device operable to provide mechanical power to the generator 114. Nonlimiting examples of suitable drivers 112 may include diesel engines, gasoline engines, ethanol engines, ethylene engines, natural gas engines, other gaseous-fuel-driven engines, gas turbines, steam turbines, wind turbines, hydraulic turbines, wave turbines, or any other sort of engine, turbine, or other driver. In an exemplary embodiment, fuel, such as natural gas or liquid propane vapor, provided to the driver 112 may be compressed and ignited within the cylinders (not shown) thereof so as to generate reciprocating motion of the pistons (not shown) in the driver 112. The reciprocating motion of the pistons may be converted to rotary motion by a crankshaft. The crankshaft (not shown) may be operatively connected to the generator 114 through a shaft (not shown), or prime mover, such that as the crankshaft is rotated by operation of the driver 112, the shaft drives the generator 114.

The generator 114 is operatively coupled to the driver 112 such that the generator 114 receives mechanical power from the driver 112 via the shaft and converts the mechanical power to electrical power. The generator 114 may be any device capable of converting at least a portion of the mechanical power provided by the driver 112 into electrical power. Nonlimiting examples of suitable generators 114 include AC synchronous generators, induction generators, permanent magnet generators and switched-reluctance generators. In an exemplary embodiment, the generator 114 generates AC power having a magnitude and power factor and an AC voltage having a magnitude and frequency. The AC power may include an active power and a reactive power. In an embodiment, the generator 114 may generate an AC voltage having a magnitude and frequency and the active power and power factor may be determined by the electrical power grid. In another embodiment, the generator 114 may generate AC power having an active and reactive power and the AC voltage and frequency may be determined by the electrical power grid.

In an exemplary embodiment, the generator sets 110 may be coupled to the distribution breaker 108 via an electric bus 116. The electric bus 116 may be configured to transmit electric power generated by the generator sets 110 to the electric power grid 104 via the power transmission network 106. The electric bus 116 may include various electrical components operable to transmit electric power generated from the generator sets 110 to the electric power grid 104. In an embodiment, closing a generator breaker 118, discussed below, coupled to a generator set 110 may connect the generator set 110 to the electric bus 116. Closing the distribution breaker 108, in an embodiment, further provides for the electric bus 116 to transmit the electrical power to the power transmission network 106.

In an exemplary embodiment, each generator set 110 may be coupled to the electric bus 116 via a generator step-up transformer 120 and the generator protection system 100. The generator step-up transformer 120 may increase the voltage output from the generator 114 to a voltage suitable for the transmission of electrical power. Such voltage may vary based, for example, on the generator 110 and electrical power grid 104 characteristics. The generator step-up transformer 120 may be electrically coupled to the generator protection system 100 and the electric bus 116.

In an exemplary embodiment, the generator protection system 100 may include a generator breaker 118 operatively connected to a generator protection unit 122. The generator breaker 118 may be a circuit breaker configured to regulate the flow of electricity between the electric bus 116 and the generator set 110. The generator breaker 118 may include a switch (not shown) configured to "trip" or disrupt the flow of electrical power between the electrical bus 116 and the generator set 110 when a fault or overload is detected by the generator protection unit 122. One of ordinary skill in the art will appreciate that the generator breaker 118 may be any circuit breaker known in the art capable of regulating the transmission of electrical power between the generator set 110 and the electric bus 116.

The generation protection unit 122 implements the methodology of synchronizing, monitoring and metering, and protection of the generator 114. In an exemplary embodiment, the generator protection unit 122 may be coupled to one or more instrument transformers utilized for the protection of the generator. The instrument transformers may include current transformers 124, voltage transformers (potential transformers) 126, and the like. In an exemplary embodiment, the generator protection unit may be coupled to at least one current transformer 124. The current transformer 124 may provide a low current representation of the current waveform from the generator 114 at a level that is appropriate for the generator protection unit 122 and other components in the power generation source 102. The current transformer 124 may include a primary winding (not shown) and a secondary winding (not shown). The primary winding may be electrically coupled to the power generation source 102 such that a fault occurring proximal the generator 114, creating an abnormal current flow, may be sensed by the current transformer 124, such that the secondary winding of the current transformer 124 is energized. The energized secondary winding transmits a signal via line 128 to the generator protection unit 122, thereby causing the generator protection unit 122 to send a signal to the generator breaker 118 via line 130, opening or tripping the circuit causing the flow therethrough of electrical power to cease.

The generator protection unit 122 may be coupled to a potential transformer 126 in an exemplary embodiment. The potential transformer 126 may provide a low voltage representation of the high voltage waveform at the power generation source 102 by stepping down the voltage magnitude to a level that can be safely used by protective relays, sensors, and other components in the power generation source 102. In an exemplary embodiment, the generator protection unit 122 includes at least two potential transformers 126. As described above, one skilled in the art will recognize that FIG. 1 is a one-line diagram, and that the potential transformer 126 and the current transformer 124 may be one, two, or three phase devices.

Each potential transformer 126 may include a primary winding (not shown) and a secondary winding (not shown).

The primary winding of a first potential transformer 132 may be electrically coupled to the electric bus 116 such that a fault occurring proximal the electric bus 116, creating an abnormal voltage, may be sensed by the first potential transformer 132, such that the secondary winding of the first potential transformer 132 is energized. The energized secondary winding transmits a signal via line 134 to the generator protection unit 122, thereby causing the generator protection unit 122 to send a signal to the generator breaker 118 via line 130, opening or tripping the circuit causing the flow therethrough of electrical power to cease. The primary winding of a second potential transformer 136 may be electrically coupled to the generator such that a fault occurring proximal the generator, creating an abnormal voltage, may be sensed by the second potential transformer, such that the secondary winding of the second potential transformer is energized. The energized secondary winding transmits a signal via line 138 to the generator protection unit, thereby causing the generator protection unit 122 to send a signal to the generator breaker 118 via line 130, opening or tripping the circuit causing the flow therethrough of electrical power to cease.

The generator protection unit 122 may include a central processing unit (CPU) 140 and a memory unit 146. The CPU 140 and memory unit 142 typically are provided as one or more integrated circuits, but they may be provided as part of an internal or external computer. In an exemplary embodiment, the CPU 140 may receive a signal from the secondary winding of the current transformer 124 and/or the potential transformer 126 corresponding to a fault in the electrical power grid 104 and/or proximal the generator 114. The CPU 140 may process the signal and transmit an output signal to one or more circuit breakers or other relay devices based on the signal received from the current transformer 124 and/or potential transformer 126. The output signal to one or more of the circuit breakers or other relay devices may be configured to trip or open the circuit operatively connected to the respective circuit breaker causing current to cease flowing therethrough.

In an exemplary embodiment, the generator protection unit 122 may include one or more multimeters 144 configured to monitor and measure one or more protection parameters corresponding to the generator 114 and/or the electrical power grid 104. In an exemplary embodiment, the protection parameters include frequency, power, voltage, and current. In some embodiments, the generator protection unit 122 may include a plurality of multimeters 144. A plurality of multimeters 144 may provide more accurate measurements and monitoring of the generator 114 and/or electrical power grid 104. The multimeters 144 may be operatively coupled to the CPU 140, such that measured and/or monitored protection parameters may be transmitted to the CPU 140 for further processing. In some embodiments, the CPU 140 may process the transmitted measured and/or monitored protection parameters such that an output signal may be sent to a graphical user interface 146 of the generator protection unit 122. Accordingly, an operator or user of the generator protection unit 122 may monitor the protection parameters via the graphical user interface 146.

The generator protection unit 122 may include one or more filtering devices 148, or display filters, configured to separate a predetermined range of protection parameter values from the protection parameters processed by the CPU 140. The display filters 148 may include any circuit configuration capable of separating a defined or predetermined range of protection parameter values from the protection parameters, such as band-pass, high-pass or low-pass filters.

In an exemplary embodiment, the display filter 148 may be configured to separate peak values of power measured by the plurality of multimeters 144, thereby removing from the graphical user interface 146 peak power measurements. Such a removable of outer laying protection parameter measurements may provide for a more stable protection parameter measurement, thereby providing the user or operator with a more accurate reading of the protection parameters. In some embodiments, the protection parameters measurements may be stored in the memory unit 142 for further processing. For example, the stored protection parameters measurements may be used for analysis purposes in determining future operating characteristics of the generator 114 and/or associated electrical power grid components.

In an exemplary embodiment, the generator protection unit 122 including the CPU 140 may be configured to synchronize the generator 114 to the electrical power grid 104. The CPU 140 may be further configured to process the phase offsets provided by the instrument transformers 124, 126 of the generator protection system 100. In an exemplary embodiment, the CPU 140 may compare a voltage signal received from the second potential transformer 136 proximal the generator 114 to the voltage signal received from the first potential transformer 132 proximal the electric bus 116. The CPU 140 may send a control signal via line 152 to the driver 112 driving the shaft, or prime mover, operatively coupled to the generator 114, such that the rotational speed of the shaft may be increased or decreased in order for the voltage waveform generated by the generator 114 to be substantially equal to the voltage waveform of the electric bus 116. In an exemplary embodiment, the CPU 140 may be configured to correct a phase offset generated by the first and/or second potential transformer 132, 136.

In an exemplary embodiment, the CPU 140 of the generator protection unit 122 may include a programmable device 150. The programmable device 150 may be configured to utilize the CANopen communications protocol. The CANopen communication protocol may include service data object (SDO) protocol and/or process data object (PDO) protocol. In another embodiment, the programmable device 150 may be configured to utilize the Ethernet communications protocol. The Ethernet communication protocol may be a Modbus TCP/IP protocol. The Ethernet communication protocol and the CANopen communication protocol may be utilized concurrently in an exemplary embodiment.

Figure 2:
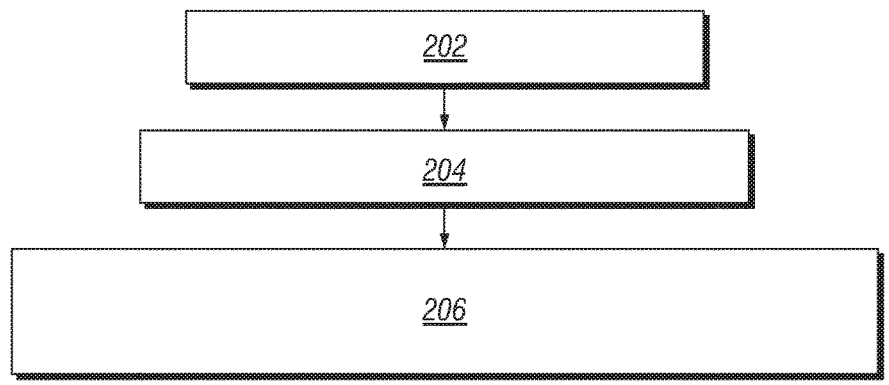
FIG. 2 illustrates a flowchart of an exemplary method for protecting a generator, according to an embodiment.

FIG. 2 is a flowchart of a method 200 for protecting a generator electrically coupled to an electrical power grid, according to an embodiment. The method 200 may include detecting a fault proximal to a generator and a generator protection system, as at 202. The generator protection system may include a generator protection unit. The generator protection unit may include a central processing unit including at least one programmable device configured to utilize an Ethernet communication protocol. The central processing unit may be configured to synchronize a first signal generated by a generator electrically coupled to the generator protection unit to a second signal comprising an electrical power grid parameter of the electrical power grid. The first signal and the second signal may have a phase offset.

The generator protection unit may include a plurality of multimeters, each electrically coupled to the electrical power grid and the central processing unit, and at least one display filter electrically coupled to the central processing unit and configured to separate a protection parameter signal into a first protection parameter signal and a second protection parameter signal. The first protection parameter signal may be transmitted to the central processing unit. The generator protection unit may also include a user interface electrically coupled to the central processing unit and configured to relay at least the first protection parameter signal to an operator of the generator protection unit.

The generator protection system may include a circuit breaker may be operatively coupled to the generator protection unit, such that the circuit breaker may be configured to provide for the transmission of electrical power therethrough depending on an output signal received from the generator protection unit. The generator protection system may also include one or more instrument transformers operatively coupled to the generator protection unit. The one or more instrument transformers may be configured to detect a fault and to transmit a fault signal to the generator protection unit upon detection of the fault.

The method 200 may also include transmitting a fault signal to the central processing unit of the generator protection unit, as at 204, and transmitting an output signal from the central processing unit of the generator protection unit to the circuit breaker, as at 206. A flow of electrical power therethrough the circuit breaker and into the generator may be disrupted such that the generator is protected, as also indicated at 206.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A generator protection unit, comprising:
   a central processing unit comprising at least one programmable device configured to utilize an Ethernet communication protocol, the central processing unit configured to synchronize a first signal generated by a generator electrically coupled to the generator protection unit to a second signal comprising an electrical power grid parameter of an electrical power grid, the first signal and the second signal having a phase offset,
   wherein the first signal comprises a voltage waveform generated by the generator,
   wherein the electrical power grid parameter comprises a voltage waveform indicative of a voltage of an electrical bus electrically coupled to the electrical power grid and the generator,
   a plurality of multimeters, each electrically coupled to the electrical power grid and the central processing unit;
   at least one display filter electrically coupled to the central processing unit and configured to separate a defined portion of a protection parameter signal, such that a remaining portion of the protection parameter signal is transmitted to the central processing unit;
   a user interface coupled to the central processing unit and configured to relay at least the remaining portion of the protection parameter signal to an operator of the generator protection unit; and
   a driver engine having a rotary shaft mechanically coupled to the generator, the central processing unit being configured to transmit a synchronization signal to the driver,
   wherein the synchronization signal causes the driver engine to increase or decrease a rotational speed of the rotary shaft so that the voltage waveform generated by the generator be substantially equal to the voltage waveform of the electric bus.

2. The generator protection unit of claim 1, wherein the programmable device is further configured to utilize CANopen communication protocol.

3. The generator protection unit of claim 1, wherein one or more of the multimeters is configured to measure the first signal, the second signal, and the protection parameter signal.

4. The generator protection unit of claim 1, wherein the protection parameter signal is indicative of the power, voltage, current, frequency, or a combination thereof, in at least one of the generator, the electrical bus, and the electrical power grid.

5. The generator protection unit of claim 1, wherein the display filter configured to separate the protection parameter signal includes a band-pass filter.

* * * * *